US011606681B2

(12) United States Patent
Shen (10) Patent No.: US 11,606,681 B2
(45) Date of Patent: Mar. 14, 2023

(54) NAVIGATION METHOD FOR EVACUATION IN EMERGENCY STATE (71) Applicant: I-Ting Shen, Tainan (TW)

(72) Inventor: I-Ting Shen, Tainan (TW)

( * ) Notice: Subject to any disclaimer, the term of this patent is extended or adjusted under 35 U.S.C. 154(b) by 46 days.

(21) Appl. No.: 17/323,169

(22) Filed: May 18, 2021

(65) Prior Publication Data

US 2022/0353661 A1 Nov. 3, 2022

(30) Foreign Application Priority Data

Apr. 28, 2021 (TW) ................. 110115370

(51) Int. Cl.
*H04W 4/90* (2018.01)
*H04W 4/024* (2018.01)
*H04W 4/02* (2018.01)
*G07C 9/00* (2020.01)
*G06T 19/00* (2011.01)
*H04W 4/33* (2018.01)

(52) U.S. Cl.
CPC ............. *H04W 4/90* (2018.02); *G06T 19/006* (2013.01); *G07C 9/00309* (2013.01); *H04W 4/024* (2018.02); *H04W 4/025* (2013.01); *H04W 4/33* (2018.02); *G07C 2009/00515* (2013.01)

(58) Field of Classification Search
CPC ......... H04W 4/90; H04W 4/024; H04W 4/33; H04W 4/025; G06T 19/006; G07C 9/00309; G07C 2009/00515
See application file for complete search history.

(56) References Cited

U.S. PATENT DOCUMENTS

| 9,830,932 | B1 | 11/2017 | Gunderson et al. |
| 10,458,151 | B1* | 10/2019 | Shen ................. E05B 45/06 |
| 2014/0282934 | A1* | 9/2014 | Miasnik ............. H04W 4/90 726/5 |
| 2020/0037142 | A1* | 1/2020 | Lofton ............. H04M 1/72463 |

FOREIGN PATENT DOCUMENTS

| KR | 20210019168 A | * | 2/2021 |
| KR | 20210033154 A | * | 3/2021 |
| WO | WO-2021007588 A1 | * | 1/2021 |

* cited by examiner

*Primary Examiner* — Umair Ahsan
(74) *Attorney, Agent, or Firm* — Alan D. Kamrath; Karin L. Williams; Mayer & Williams PC (57) ABSTRACT

A navigation method for evacuation in an emergency state includes creating a visualized map image based on an outdoor space and at least one indoor space in an area. A plurality of indoor locators and a plurality of outdoor locators are used to locate a personal mobile device held by a person. The personal mobile device is located when a controlled event, such as a gunshot event or a fire event, occurs. An augmented reality image is used to guide the person to an emergency refuge area. A visualized mag image is used to provide the person with information containing the location of the personal mobile device, the controlled event location, the emergency refuge area, and an evacuation route, thereby assisting the person in rapidly and easily moving away from the controlled event location.

10 Claims, 6 Drawing Sheets

NAVIGATION METHOD FOR EVACUATION IN EMERGENCY STATE

BACKGROUND OF THE INVENTION

The present invention relates to a navigation method for evacuation in an emergency state and, more particularly, to a navigation method for guiding persons to a safe place in an emergency state by using augmented reality navigation when an emergency event, such as a gunshot event, an intrusion, a fire, etc., occurs.

In an area having many large buildings and permitting many people to access, such as a school, it is difficult to find persons with bad intentions, such as a person carrying a gun or a knife enters a school. Therefore, gunshot events, assaults, or homicide in schools are heard from time to time. Very often, there are many people in such an area, such that the casualty is high when an emergency event, such as a gunshot event, occurs. Furthermore, it is difficult for a manager to inform all people in the area to evacuate within a short period of time, leading to more casualty. Furthermore, plotting of interior spaces of large buildings, such as school buildings, department stores, subway stations, etc., is relatively complicated, resulting in difficulties in escape and evacuation during a fire.

BRIEF SUMMARY OF THE INVENTION

To solve the above drawback, the present invention provides a navigation method for evacuation in an emergency state, comprising:

creating an electronic map of a place to be controlled and storing the electronic map;

connecting a plurality of door locks in the place with a control device, with the control device obtaining control authority of each of the plurality of door locks and being in connection with a server;

connecting an unlocking device with the control device, with the control device identifying the unlocking device, wherein the control device actuates and sets all of the plurality of door locks to a locking state when the unlocking device is identified as being incorrect, and wherein each of all of the plurality of door locks obtains unlocking authority when the unlocking device is identified as being correct;

detecting whether a controlled event occurs, wherein each of the plurality of door locks retains the unlocking authority when no controlled event is detected, wherein information containing a location of a controlled event is sent to the server when the controlled event is detected;

setting at least one of the plurality of door locks near the location of the controlled event to the locking state and revoking the unlocking authority of the at least one of the plurality of door locks, and entering an evacuation state;

locating a personal mobile device held by a person in the place; and using the personal mobile device to pick up an image of an environment of the person, displaying an augmented reality image on a display of the personal mobile device based on the image of the environment, and using the augmented reality image to guide the person to an emergency refuge area in the place, wherein the augmented reality image shows a moving direction indicator to guide the person to the emergency refuge area.

The navigation method for evacuation in an emergency state according to the present invention can easily guide the person holding the personal mobile device to the emergency refuge area via the augmented reality image.

In an example, locating the personal mobile device includes disposing a plurality of indoor locators in a plurality of indoor spaces in the place. When the personal mobile device is in one of the plurality of indoor spaces, the personal mobile device is connected to one of the plurality of indoor locators nearby, thereby locating the person holding the personal mobile device. A visualized map image is shown on the display. A personal mobile device location is marked on the visualized map image.

In an example, the navigation method further includes marking the controlled event on the visualized map image.

In an example, guiding the person to the emergency refuge area includes showing the emergency refuge area and an evacuation route on the visualized map image. The evacuation route shows a path from the location of the personal mobile device to the emergency refuge area.

In an example, the augmented reality image is shown on an upper portion of the display, and the visualized map image is shown on a lower portion of the display.

In an example, the controlled event is a gunshot event detected by one of a plurality of gunshot detection devices or a fire detected by one of a plurality of fire detection devices. Showing the controlled event location on the visualized map image includes showing a gun symbol on the visualized map image when the controlled event is a gunshot event or showing a fire symbol on the visualized map image when the controlled event is a fire event.

In an example, locating the personal mobile device includes disposing a plurality of outdoor locators in an outdoor space. When the personal mobile device is in the outdoor space, the personal mobile device is connected to one of the plurality of outdoor locators nearby, thereby locating the person holding the personal mobile device. A visualized map image is shown on the display. The personal mobile device location is marked on the visualized map image.

In an example, the electronic map includes at least one outdoor map and at least one indoor map. When the personal mobile device is located by one of the plurality of indoor locators, the visualized map image shows an indoor image of a respective one of the plurality of indoor spaces in which an associated indoor locator is disposed. When the personal mobile device is located by one of the plurality of outdoor locators, the visualized map image shows an outdoor image of an outdoor space in which an associated outdoor locator is disposed. The visualized map image shows the controlled event location, the personal mobile device location, the emergency refuge area, and an evacuation route. The evacuation route shows a path from the personal mobile device location to the emergency refuge area.

In an example, the navigation method further includes determining whether to change the controlled event location, wherein the controlled event location is not changed when no new controlled event is detected. A new controlled event location is designated when a new controlled event occurs in a different location is detected, and a location indicating the new controlled event is shown on the visualized mag image.

In an example, the navigation method further includes determining whether to change the emergency refuge area. The emergency refuge area and the evacuation route are not changed when no new controlled event is detected or the new controlled event is not in the evacuation route. When a controlled event occurs in the emergency refuge area or a new controlled event occurs in the evacuation route, a new emergency refuge area is designated and shown on the visualized data image, and a new evacuation route is given based on the location of the personal mobile device and the new emergency refuge area.

In an example, the plurality of indoor locators is disposed in the plurality of door locks, respectively.

The present invention will become clearer in light of the following detailed description of illustrative embodiments of this invention described in connection with the drawings.

DETAILED DESCRIPTION OF THE INVENTION

Figure 1:
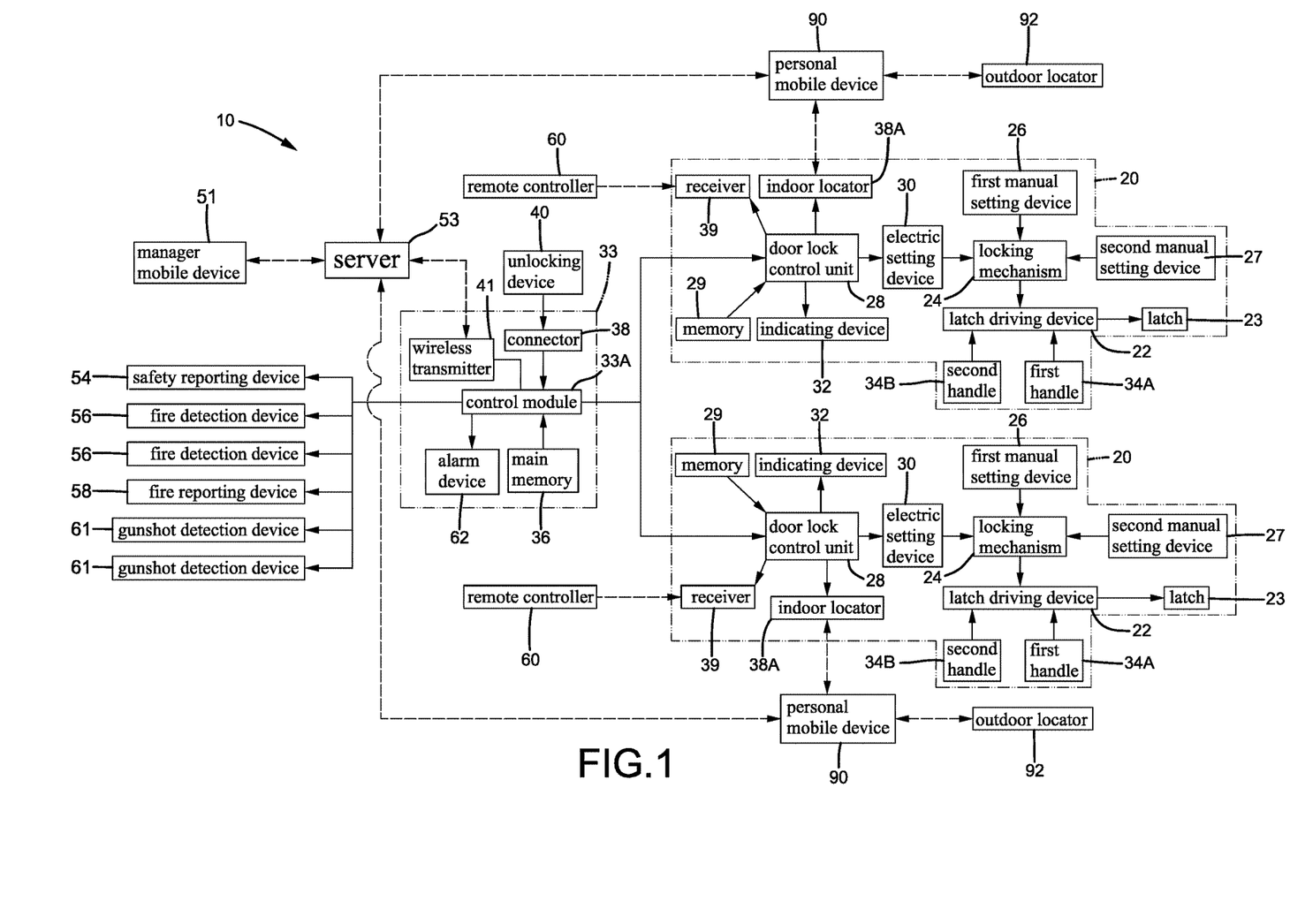
FIG. 1 is a diagrammatic block diagram of a central access control system capable of carrying out a navigation method for evacuation in an emergency state according to the present invention.

FIG. 1 shows a diagrammatic block diagram of a central access control system 10 capable of carrying out a navigation method for evacuation in an emergency state according to the present invention. The central access control system 10 is disposed in a place having a plurality of doors. The place can be a school, a building, etc. The central access control system 10 includes a plurality of door locks 20 mounted on the plurality of doors of the place. Each door is mounted in a passage to a space, such as a classroom.

Each of the plurality of door locks 20 includes a latch driving device 22 and a latch 23 actuatable by the latch driving device 22 to move between a latching position and an unlatching position. Each of the plurality of door locks 20 further includes a locking mechanism 24 for prohibiting operation of the latch driving device 22, a first manual setting device 26, a second manual setting device 27, an electric setting device 30, a door lock control unit 28 electrically connected to the electric setting device 30, and an indicating device 32. The first and second manual setting devices 26 and 27 are configured to set the locking mechanism 24 to a locking state or an unlocked state. Each indicating device 32 can include a lighting member capable of generating a colored light (such as a green light and a red light) and/or a speaker or a buzzer for generating sound. Each indicating device 32 is mounted to an inner side of a respective door. Each of the plurality of door locks 20 further includes a memory 29 electrically connected to the door lock control unit 28. Each of the plurality of door locks 20 further includes an indoor locator 38A electrically connected to a respective door lock control unit 28. Each indoor locator 38A can include a Bluetooth receiver and/or a Bluetooth transmitter. Each indoor locator 38A includes a specific hardware identification serial number. The central access control system 10 can record the location of each indoor locator 38A, such as Room 501 at $3^{rd}$ floor of Building A, Room 202 at $1^{st}$ floor of Building C, etc.

The first manual setting device 26 of each of the plurality of door locks 20 is mounted to the inner side of a respective door. The second manual setting device 27 of each of the plurality of door locks 20 is mounted to an outer side of a respective door. The first and second manual setting devices 26 and 27 can be key cylinders of any desired form as conventional including but not limited to of a commercially available type. A key can be used to release the locking state of the first manual setting device 26 or the second manual setting device 27. Thus, the locking mechanism 24 can be set to the locking state or the unlocked state. Each of the plurality of door locks 20 further includes a first handle 34A mounted to the outer side of the respective door (such as the outside) and operatively connected to the latch driving device 22. Each of the plurality of door docks 20 further includes a second handle 34B mounted to the inner side of the respective door (such as the inside) and operatively connected to the latch driving device 22.

The electric setting device 30 is also used to set the locking mechanism 24 to the locking state or the unlocked state. In a case that the locking mechanism 24 is set to the locking state by the electric setting device 30, it is impossible to set the locking mechanism 24 to the unlocked state by the first manual setting device 26 or the second manual setting device 27. Nevertheless, when the locking mechanism 24 is set to the unlocked state by the electric setting device 30, the locking mechanism 24 can be set to the locking state or the unlocked state by the first manual setting device 26 or the second manual setting device 27. Furthermore, when the locking mechanism 24 is set to the locking state by the first manual setting device 26, the second manual setting device 27, or the electric setting device 30, the latch 23 cannot move to the unlatching position by operating the first handle 34A but can move to the unlatching positon by operating the second handle 34B at the inner side of the respective door. On the other hand, when the locking mechanism 24 is set to the unlocked state by the electric setting device 30 and the first manual setting device 26 (or the second manual setting device 27), the latch 23 can move to the unlatching position by operating the first handle 34A or the second handle 34B, permitting subsequent opening of the respective door.

The central access control system 10 further includes a remote controller 60. Each of the plurality of door locks 20 further includes a receiver 39 electrically connected to the door lock control unit 28. The remote controller 60 and the receivers 39 can be operated to set the locking mechanism 24 of at least one of the plurality of door locks 20 (by using the electric setting device 30) into the locking state within a predetermined range. For example, when at least one door lock 20 within the transmission area of the remote controller 60 receives a signal from the remote controller 60, the locking mechanism 24 of the at least one door lock 20 within the transmission area of the remote controller 60 is set to the locking state.

Furthermore, an emergency state identification information is stored in the remote controller 60. When the remote controller 60 is used to set the plurality of door locks 20 to the locking state, the emergency state identification information received by a respective door lock 20 is compared with the comparison identification information in the respective memory 29. When the emergency state identification information is identified as being correct, the respective door lock 20 receiving the emergency state identification information from the remote controller 60 will be set to the locking state and will lose the unlocking authority. When the respective door lock 20 identifies that the emergency state identification information from the remote controller 60 is incorrect, the respective door lock 20 remains in the original state (locking state or unlocking state).

The central access control system 10 further includes a control device 33 having a control module 33A, a main memory 36 electrically connected to the control module 33A, a connector 38 electrically connected to the control module 33A, and a wireless transmitter 41 electrically connected to the control module 33A. The connector 38 can include an elongated slot that receives electrodes. The control module 33A is electrically connected to the door lock control units 28 of the plurality of door locks 20. The main memory 36 stores a comparison identification information corresponding to an enabling identification information of an unlocking device 40. The control module 33A can be electrically connected to the door lock control units 28 of the plurality of door locks 20 by wire or wireless connection.

The central access control system 10 further includes a safety reporting device 54 electrically connected to the control module 33A of the control device 33, a plurality of fire detection devices 56 electrically connected to the control module 33A, a fire reporting device 58 electrically connected to the control module 33A, and a plurality of gunshot detection devices 61 electrically connected to the control module 33A. The control device 33 further includes an alarm device 62 electrically connected to the control module 33A. The control device 33 can activate the alarm device 62 to generate an alarm message, such as sound, light, or both.

The plurality of fire detection devices 56 is disposed in various buildings 78 of the place to detect whether a fire occurs and to report the fire to the control module 33A. Each of the plurality of fire detection devices 56 can be given a specific hardware identification serial number. The central access control system 10 can record the location where each of the plurality of fire detection devices 56 is disposed (e.g., the fire detection device whose hardware identification serial number is 001 is disposed in Room 301 of Building A). Thus, the control device 33 can identify the location of the fire event. The fire reporting device 58 can be connected to a fire system to inform the fire.

The safety reporting device 54 can be connected to the police system to inform the police system of emergency. The plurality of gunshot detection devices 61 is disposed in various buildings 78 of the place to detect whether a gunshot event occurs and to report the gunshot event to the control module 33A. The plurality of gunshot detection devices 61 is used to detect whether any ammunition is fired in a specific range thereground. Each of the plurality of gunshot detection devices 61 can be given a specific hardware identification serial number. The central access control system 10 can record the location where each of the plurality of gunshot detection devices 61 is disposed (e.g., the gunshot detection device whose hardware identification serial number is A01 is disposed in Room 105 of Building B). The plurality of gunshot detection devices 61 can, but should not be limited to, use a sound detection technique or an audio wave detection technique to determine whether a sound detected is a gunshot. An example of the gunshot detection system is disclosed in U.S. Pat. No. 9,830,932. The central access control system 10 further includes a server 53 connected to the control device 33 and a manager mobile device 51 that can be used to log in the server 53.

The control device 33 is configured to match with the unlocking device 40. The unlocking device 40 can be a door access card and is configured to control the control device 33. A comparison identification information corresponding to the enabling identification information of the unlocking device 40 is stored in the memory 29 of each of the plurality of door locks 20.

The central access control system 10 further includes at least one personal mobile device 90 having a GPS (global positioning system) chip that cooperates with at least one outdoor locator 92 to proceed with outdoor positioning in an outdoor space. The at least one outdoor locator 92 can be a known positioning satellite. The at least one personal mobile device 90 further includes functions of Bluetooth signal transmission and/or Bluetooth signal reception as well as GSM (global system for mobile communications. The at least one personal mobile device 90 further includes a display 90A. An emergency evacuation APP can be installed in the at least one personal mobile device 90 in advance to cooperate with the navigation method.

Figure 2:
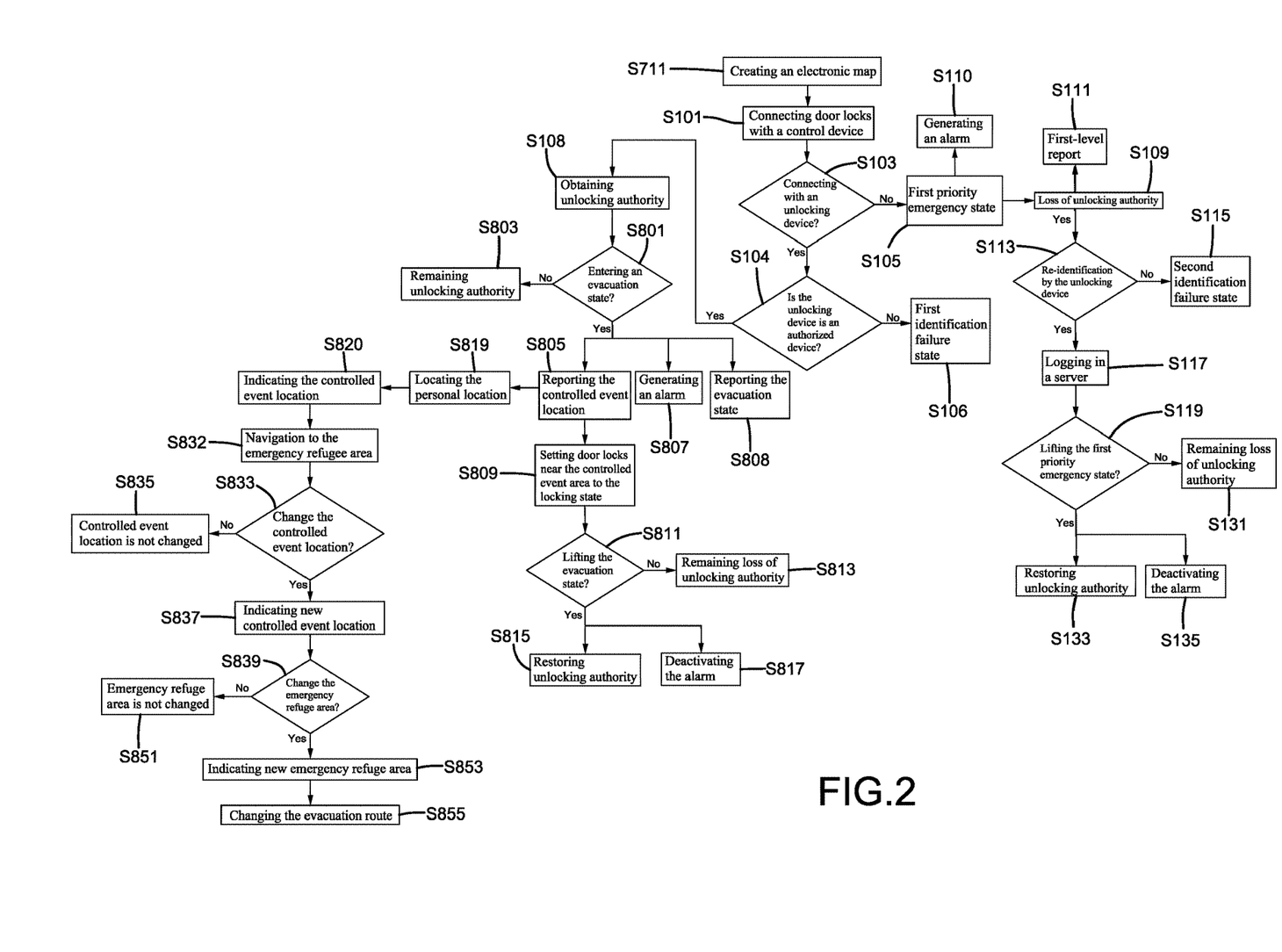
FIG. 2 is a diagrammatic flowchart illustrating the navigation method for evacuation in an emergency state according to the present invention.
Figure 3:
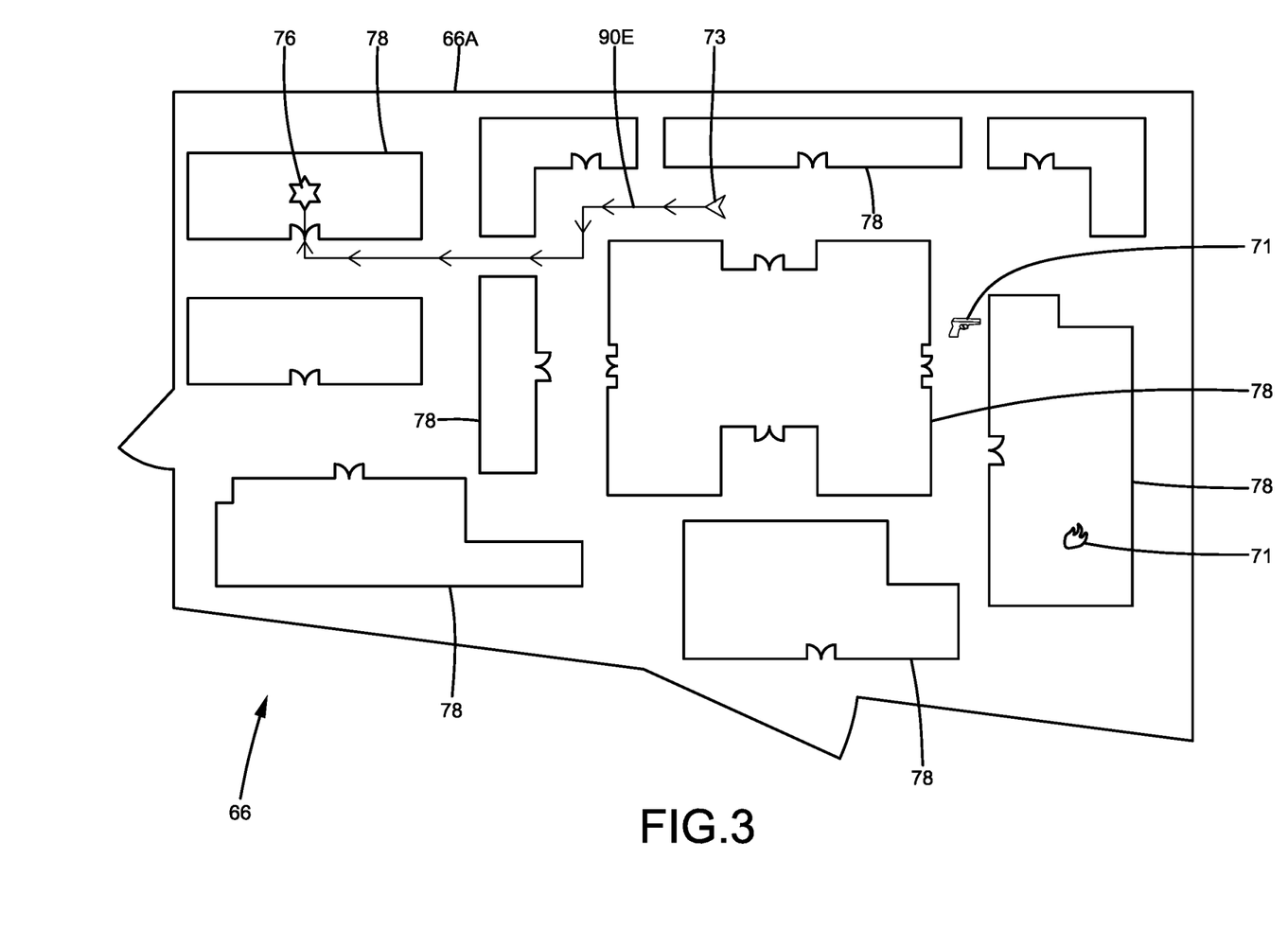
FIG. 3 is a diagrammatic diagram illustrating an electronic map of an outdoor space.
Figure 4:
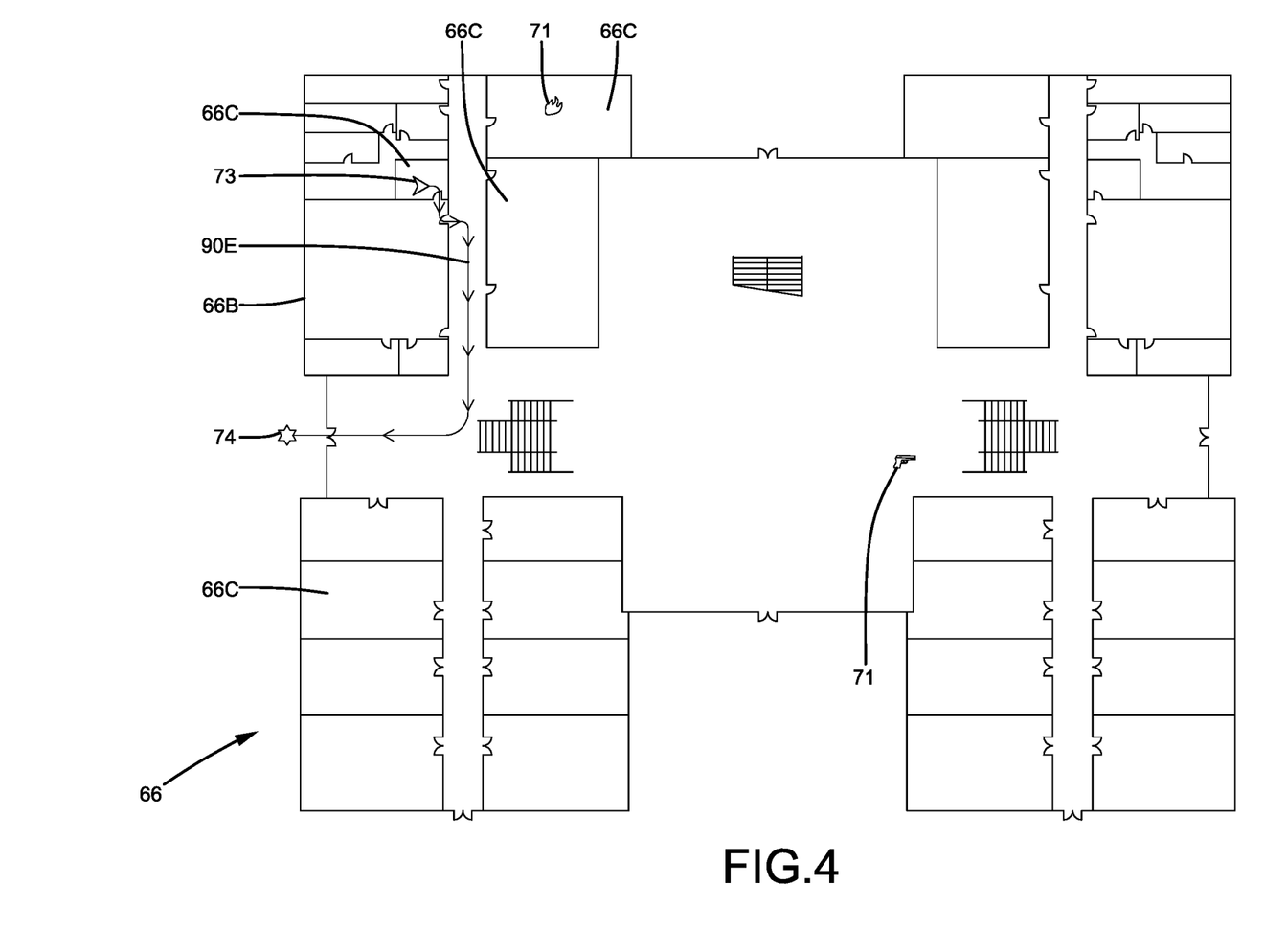
FIG. 4 is a diagrammatic diagram illustrating an electronic map of an indoor space.

In an example of carrying out the navigation method according to the present invention using the central access control system 10, for the sake of explanation, it will be assumed that the place is a school. Firstly, in step S711, an electronic map 66 for a to-be-controlled area is created and stored. The electronic map 66 can be an outdoor map 66A (showing the distribution of the plurality of buildings 78 in the school, as shown in FIG. 3) and an indoor map 66B of each floor of each building 78 (FIG. 4). Each indoor map 66B can show the disposition of a plurality of rooms 66C. The outdoor map 66A and the indoor maps 66B can be stored in the server 53.

It is further assumed that each door is closed and the latches 23 are in the latching position. A connection between the plurality of door locks 20 and the control device 33 is established (step S101), such that the control device 33 obtains the control authority of the plurality of door locks 20. Specifically, the control device 33 obtains the control authority of the electric setting device 30 of each of the plurality of door locks 20. Furthermore, the control device 33 can set at least one of the locking mechanisms 24 of the plurality of door locks 20 to the locking state or the unlocked state at the same time.

Next, the unlocking device 40 is connected to the control device 33 (step S103) by any suitable way. In an example, the unlocking device 40 is in the form of an electronic card physically insertable into control device 33. After the unlocking device 40 is inserted into the control device 33, an electrical connection is established to permit the control device 33 to read the enabling identification information in the unlocking device 40. Alternatively, the unlocking device 40 can be a smart phone held by a manager for connection with the control device 33 via wireless transmission (such as Bluetooth, wi-fi, etc.). Thus, the unlocking device 40 can be connected to the control device 33 which can identify the enabling identification information. Alternatively, the unlocking device 40 is in the form of a remote controller that can transmit the enabling identification information to permit access by the control device 33.

Next, the control device 33 identifies whether the unlocking device 40 is an authorized device (step S104). Specifically, the control device 33 compares the enabling identification information in the unlocking device 40 with the comparison identification information in the main memory 36. When the control device 33 identifies that the enabling identification information in the unlocking device 40 does not match with the comparison identification information in the main memory 36 (the unlocking device 40 is identified as being incorrect), the control device 33 enters a first identification failure state (S106), and the control device 33 controls the electric setting devices 30 of the plurality of door locks 20 to set the locking mechanisms 24 of the plurality of door locks 20 to the locking state without activating the safety reporting device 54. Thus, all door locks 20 lose their independent unlocking authority. Namely, neither of the first and second manual setting devices 26 and 27 of any of the plurality of door locks 20 can be independently operated for setting the respective locking mechanism 24 to the unlocked state. As a result, all doors are closed with their latches 23 in the latching position, preventing opening of the doors.

On the other hand, when the control device 33 identifies that the enabling identification information in the unlocking device 40 matches with the comparison identification information in the main memory 36 (the unlocking device 40 is identified as being correct), the plurality of door locks 20 obtains independent unlocking or locking authority (step S108). Namely, each and every of the plurality of door locks 20 can operate independently. Specifically, the control device 33 actuates none of the electric setting devise 30 of the plurality of door locks 20, such that the locking mechanisms 24 of the plurality of door locks 20 remain in their original states. Furthermore, each of the plurality of door locks 20 permits use of the first manual setting device 26 or the second manual setting device 27 to set the respective locking mechanism 24 to the locking state or unlocked state. Furthermore, each of the plurality of door locks 20 set in the locked state allows operation of the respective first handle 34A or the respective second handle 34B to actuate the respective latch driving device 22 to thereby retract the respective latch 23 to the unlatching position.

When the unlocking device 40 is physically removed or disconnected from the control device 33, all door locks 20 connected to the control device 33 are set to the locking state and are locked, which is the first priority emergency state S105. Specially, after the enabling identification information in the unlocking device 40 is identified as being correct, if the unlocking device 40 is directly removed or disconnected from the connector 38 of the control device 33, the control device 33 will enter the first priority emergency state S105, and the electric setting devices 30 of all door locks 20 are actuated by the control device 33 to set the locking mechanisms 24 of all door locks 20 to the locking state, such that the unlocking authority of all door locks 20 is revoked (S109). In this case, each door cannot be operated to set the respective locking mechanism 24 to the unlocked state by inserting a key to operate the first manual setting device 26 or the second manual setting device 27. Thus, the door cannot be opened by the first handle 34A. Namely, without physical connection between the unlocking device 40 and the control device 33, all door locks 20 lose the unlocking authority (S109) and cannot be independently operated to the unlocked state. This achieves a control function of avoiding easy opening of all doors from the outside while still permitting the latch 23 to move to the unlatching position by operating the second handle 34B at the inner side of the respective door even though all door locks 20 lose the unlocking authority (S109). Furthermore, after the control device 33 enters the first priority emergency state S105, the indicating devices 32 of all door locks 20 send out an emergent alarm signal.

At the same time of entering the first priority emergency state S105, the control module 33A of the control device 33 activates the alarm device 62 to generate an alarm message in the form of at least one of sound and light.

After all door locks 20 have lost their unlocking authority, a first-level report is sent out to a police system (step S111). Specifically, after the unlocking device 40 has been physically removed from the connector 38 of the control device 33 and all door locks 20 have lost the unlocking authority, the control device 33 actuates the safety reporting device 54 to inform the police system of the emergency event (such as an intrusion of an intruder into the school).

When the unlocking device 40 is physically reconnected to the control device 33, the control device 33 re-identifies whether the unlocking device 40 is correct (step S113). After the emergency event has been solved (e.g., the intruder has been arrested), the unlocking device 40 can be reconnected to the connector 38 of the control device 33 to enable the control device 33 to read the enabling identification information in the unlocking device 40.

When the control device 33 re-identifies again that the unlocking identification information of the unlocking device 40 as being incorrect, all door locks 20 are set to lose the unlocking authority (S115). Specifically, after the emergency event has been solved and the unlocking device 40 has been reconnected to the control device 33, when the control device 33 identifies the enabling identification information as being incorrect, the control device 33 enters a second identification failure state S115. All door locks 20 remain in the locking state and lose the unlocking authority.

When the control device 33 identifies the unlocking device 40 as being correct in step S113, the server 53 is logged in. For example, a computer or a smart device can be utilized to login the server 53 by a preset account and a password, connecting the server 53 with the control device 33 (step S117). After logging in the server 53, the manager can select whether to lift the first priority emergency state (S119). Namely, after logging in the server 53, when the first priority emergency state S105 is not lifted, all door locks 20 set in the locked state remain in the unlocking authority-revoked state (S131). On the other hand, after logging in the server 53 and after the control device 33 identifies the unlocking device 40 as being correct, when the first priority emergency state S105 is lifted, all door locks 20 set in the locking state restores the authority of independent locking and independent unlocking (S133). Furthermore, after the authority of independent locking and independent unlocking has been restored (S133), the control module 33A deactivates the alarm device 62 and stops operation of the indicating devices 32 of all door locks 20.

It is noted that after the first priority emergency state S105 is entered, even though the emergency event has been solved and the control device 33 identifies the unlocking device 40 as being correct, none of the door locks 20 is granted the unlocking authority. Specifically, all door locks 20 obtain the unlocking authority only after the unlocking device 40 is identified as being correct and the first priority emergency state S105 is lifted after the manager logs in the server 53 and lifts the first priority emergency state S105. After the unlocking authority is granted, the locking mechanism 24 of each of the plurality of door locks 20 can be set to the locking state or unlocked state through the first manual setting device 26 or the second manual setting device 27.

It is further noted that restoring the unlocking authority can be so set that all door locks 20 restore their states before entering the first priority emergency state S105. For example, in a case that a portion of all door locks 20 are independently set into the locking state and that the remaining portion of all door locks 20 are independently set into the unlocked state, after the first priority emergency state is lifted, the portion of all door locks 20 set into the locking state remains in the locking state but can be independently operated for unlocking purposes. Furthermore, after the first priority emergency state is lifted, the remaining portion of all door locks 20 set into the unlocked state restores the unlocked state and can be independently operated for locking purposes.

The navigation method according to the present invention further includes determining whether to enter an evacuation state (S801). When no event requiring entrance of the evacuation state is detected, the evacuation state is not entered. Each of the plurality of door locks 20 retains its unlocking authority (S803).

A controlled event requiring entrance of the evacuation state includes, but not limited to, detection of a fire by at least one of the plurality of fire detection devices 56, detection of a gunshot by at least one of the plurality of gunshot detection devices 61, or detection of the intrusion by burglars. For example, when any one of the plurality of fire detection devices 61 detects a gunshot and reports it to the control device 33, the evacuation state is entered. In another example, when any one of the plurality of gunshot detection devices 61 detects a gunshot and reports it to the control device 33, the evacuation state is entered. In a further example, when a person (such as a security guard or s security staff) finds intrusion of a burglar, the evacuation state is entered. Entrance of the evacuation state can be achieved by logging in the server 53 and publishes the evacuation state by the backstage.

In step S805, the controlled event is reported. Specifically, the location of the controlled event is reported back to the server 53. For example, when one of the plurality of fire detection devices 56 detects a fire and reports it to the control device 33, the control device 33 can identify the location of the fire by the hardware identification serial number (of the fire detection device 56 that detects the fire) contained in the signal received by the control device 33. In another example, when one of the plurality of gunshot detection devices 61 detects a gunshot and reports it to the control device 33, the control device 33 can identify the location of the gunshot event by the hardware identification serial number (of the gunshot detection device 61 that detects the gunshot) contained in the signal received by the control device 33.

In step S819, the location of a person can be located by detecting the personal mobile device 90. Specifically, each indoor locator 38A or each outdoor locator 92 can be used to locate the personal mobile device 90 to thereby locate the person holding the personal mobile device 90.

For example, when the personal mobile device 90 is connected to an outdoor locator 92, it is identified that the person holding the personal mobile device 90 is in the outdoor space. Thus, the outdoor map 66A can be shown in the visualized map image 90D on the display 90A of the personal mobile device 90, and the personal mobile device location 73 (FIG. 3) is marked on the outdoor map 66A. It is noted that the symbol indicative of the personal mobile device location 73 can be in the form of an arrow that indicates the heading direction of the personal mobile device 90.

In a case that the personal mobile device 90 is connected to one of the plurality of indoor locators 38A, it is identified that the person holding the personal mobile device 90 is in an indoor space, and the hardware identification serial number of the indoor locator 38A connected to the personal mobile device 90 can be used to locate the room (such as Room 202 at $2^{nd}$ floor of Building A). Thus, the respective indoor map 66B can be shown on the visualized map image 90D on the display 90A of the personal mobile device 90, and the personal mobile device location 73 can be marked on the indoor map 66B, as shown in FIG. 4.

In step S820, with the personal mobile device 90 in connection with the server 53, the controlled event location 71 can be displayed on the visualized map image 90D on the display 90A. In a case that the evacuation state is entered because of a fire, a symbol of fire is shown in a corresponding position on the visualized map image 90D. In another case that the evacuation state is entered because of a gunshot event, a symbol of a gun is shown in a corresponding position on the visualized map image 90D.

In step S832, navigation to an emergency refugee area 74 is carried out. Specifically, the personal mobile device 90 is used to pick up an image of the real scene of the environment where the person stands, and an augmented reality image 90B based on the picked-up real scene is shown on the display 90B. A moving direction indicator 90C is shown on the augmented reality image 90B to guide the person holding the personal mobile device 90 to the emergency refugee area 74 selected by the central access control system 10. The visualized map image 90D further shows an emergency refuge area 74 selected according to the personal mobile device location 73 and an evacuation route 90E leading to the emergency refugee area 74. Namely, the evacuation route 90E shows the path from the location of the personal mobile deice 90 to the emergency refugee area 74. The personal mobile device location 73 can be indicated by an arrow head, and the arrow indicates the heading direction of the located personal mobile device 90. It is noted that the emergency refugee area 74 can be a room 66C of a building 78 or an outdoor space.

When the personal mobile device 90 locates the person via an indoor locator 38A, the visualized map image 90D shows the map of the associated indoor space. On the other hand, when the personal mobile device 90 locates the person via an outdoor locator 92, the visualized map image 90D shows the map of the outdoor space.

In step S833, it is determined whether the controlled event location 71 is changed. Specifically, when no new controlled event is detected, the controlled event location 71 is not changed (step S835). On the other hand, when a new controlled event occurs in another location other than the original controlled event location 71, a new controlled event location is designated (step S837) and is shown on the visualized map image 90D. For example, when a fire occurs and spreads with time, a plurality of flame symbols can be added into the visualized map image 90D to indicate a plurality of fire sites. In another example that several gunmen intrude into a school and move separately, several gunshots could be detected, and several gunshot locations can be shown on the visualized map image 90D.

In step S839, it is determined whether to change the emergency refuge area 74. When no controlled event occurs in the original emergency refuge area 74 or the new controlled event location 71 is not in the evacuation route 90E, the emergency refuge area 74 is not changed (Step S851). Namely, the emergency refugee area 74 and the evacuation route 90E in the visualized map image 90D are not changed. On the other hand, when a controlled event occurs in the original emergency refuge area 74 or the new controlled event location 71 is in the evacuation route 90E, a new emergency refuge area is designated (S853). The visualized map image 90D shows the new emergency refuge area 74 and updates the evacuation route 90E according to the current personal mobile device location and the new emergency refuge area 74.

In step S809, the door locks 20 in the area near the controlled event location are set to the locking state and lose their unlocking authority while reporting the controlled event. For example, when at least one fire detection device 56 detects a fire, the control device 33 automatically sets a portion of the plurality of door locks 20 associated with the position of the at least one fire detection device 56 to the locking state (the associated door locks lose their unlocking authority). Thus, the associated doors cannot be opened from the outer side, reducing the spreading speed of the fire. Alternatively, when at least one gunshot detection device 61 detects a gunshot event, the control device 33 automatically sets a portion of the plurality of door locks 20 associated with the position of the at least one gunshot detection device 61 to the locking state (the associated door locks lose their unlocking authority). Thus, the associated doors cannot be opened from the outer side, lowering the moving speed of the gunman.

In step S811, it is determined whether to lift the evacuation state. If the evacuation state is not lifted, the portion of the plurality of door locks 20 set to the locking state owing to the emergency event (such as a fire or gunshot) loses the unlocking authority (S813), and the alarm device 62 keeps operating to generate an alarm. After logging in the server 53 while the unlocking device 40 is connected to the control device 33, the evacuation state can be optionally lifted to restore the unlocking authority (S815), and the alarm is deactivated to stop the alarm device 62 (S817). Furthermore, the controlled event location 71 is erased from the visualized map image 90D on the personal mobile device 90 (the fire symbol in the form of a flame and the gunshot symbol in the form of a gun are not displayed).

Specifically, in an example of a fire, after the fire has been put out, the manager can log in the server 53 while the unlocking device 40 is connected to the connector 38 of the control device 33 and is identified as being correct. Then, the manager can press an icon representing lifting of the evacuation state, such that the portion of the plurality of door locks 20 (which was set to the locking state owing to the fire) restores the unlocking authority, and the control module 33A deactivates the alarm to stop the alarm device 62. On the other hand, when manager does not press the icon representing lifting of the evacuation state, the portion of the plurality of door locks 20 (set to the locking state owing to the fire) remains in the unlocking authority-revoked state, and the alarm device 62 keeps operating to generate the alarm.

It is further noted that restoring the unlocking authority can be so set that all door locks 20 restore their states before entering the evacuation state. For example, in a case that a portion of all door locks 20 are independently set into the locking state and that the remaining portion of all door locks 20 are independently set into the unlocked state, after the evacuation state is lifted, the portion of all door locks 20 set into the locking state remains in the locking state but can be independently operated to restore the unlocking state.

While entering the evacuation state, such as due to a gunshot event (step S801), an alarm is generated (S807). Specifically, the control module 33A activates the alarm device 62 to generate at least one of sound and light, such that the person near the control device 33 (such as the principal in the principal's office or a guard in the security office) can be aware of the gunshot event through the alarm device 62. Furthermore, the indicating device 32 of each of the plurality of door locks 20 is activated by the control device 33 to generate an emergency alarm signal, notifying persons at places other than the gunshot location.

In step S808, the evacuation state is also reported while entering the evacuation state. The evacuation state can be reported to the police system by the safety reporting device 54. Alternatively, in the case of a fire, the fire event can be reported to the fire system through the fire reporting device 58. Thus, the police or the firemen can reach the controlled event location in the shortest time. Furthermore, the police or the firemen can use their own personal mobile device (such as a smart phone) to login in the server 53 after installation of the emergency evacuation APP, thereby obtaining the electronic map 66 of the place (such as a school) and the controlled event location 71. In a case of a gunshot event, the police can simulate an attack route or an attack plan based on the personal mobile device location 73 and the gunshot location on the visualized map image 90D. In another case of a fire event, the firemen can simulate a plan based on the personal location and the fire event location on the visualized map image 90D.

Figure 5:
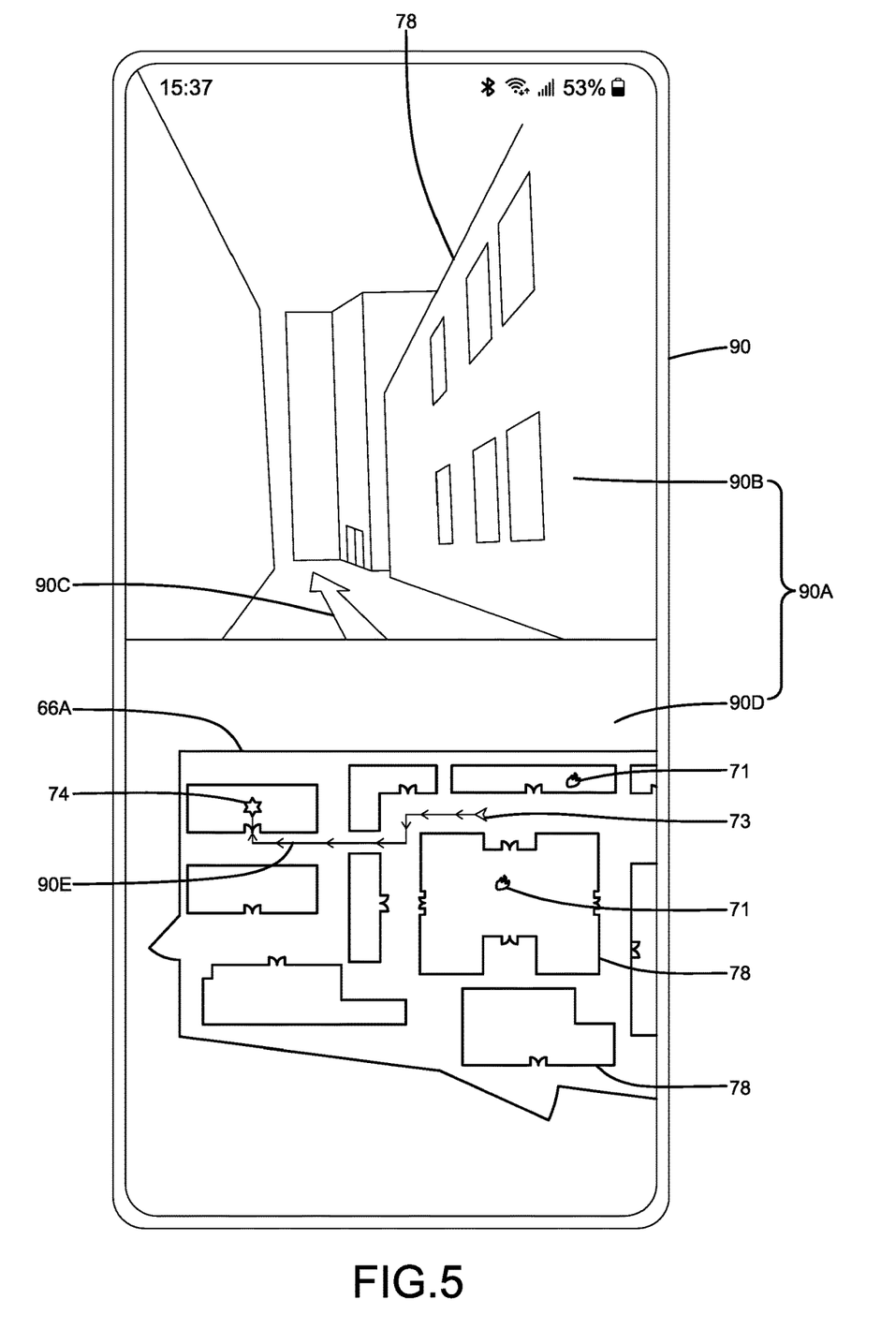
FIG. 5 is a diagrammatic diagram illustrating navigation using a personal mobile phone, augmented reality, and an electronic map of an outdoor space.

With reference to FIGS. 3 and 5, for ease of explanation, it is assumed that a person holding a personal mobile device 90 is in an outdoor space which enters an evacuation state due to a fire event. The personal mobile device 90 is connected to an outdoor locator 92 via the emergency evacuation APP to locate the person. Furthermore, the visualized map image 90D at the lower end of the display 90A of the personal mobile device 90 is the outdoor map 66A showing a personal mobile device location 73, a flame symbol indicating the fire site, and a star indicating an emergency refuge area 74. As shown in FIG. 5, fires occur in two buildings 78, and the personal mobile device location 73 is between the two buildings 78. The emergency evacuation APP activates a camera of the personal mobile device 90 to pick up the image of the environment around the personal mobile device location 73, and the image is displayed on the display 90A and is above the visualized map image 90D. Furthermore, an evacuation route 90E based on the personal mobile device location 73 and the emergency refuge area 74 is displayed on the outdoor map 66A. A moving direction indicator 90C is obtained according to an angle and a position of the personal mobile device 90, and the moving direction 90C overlaps with the image of the environment to form an augmented reality image 90B.

Thus, the person holding the personal mobile device 90 can quickly move to the emergency refuge area 74 according to the augmented reality image 90B based on which the person can know his or her position and the distance to the fire event location as well as whether he or she is approaching the emergency refuge area 74.

Figure 6:
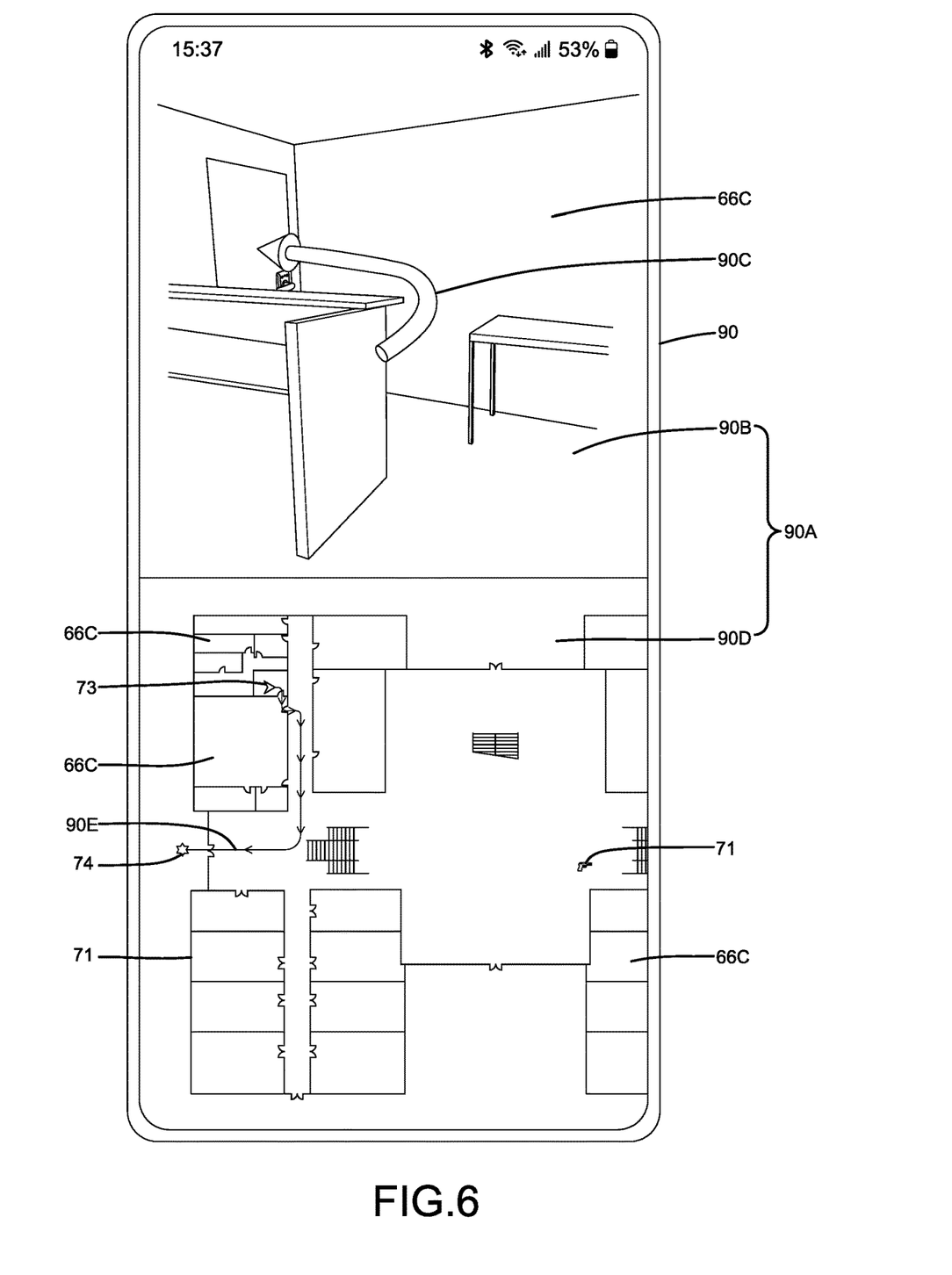
FIG. 6 is another diagrammatic diagram illustrating navigation using the personal mobile phone, the augmented reality, and an electronic map of an indoor space.

With reference to FIGS. 4 and 6, in another example, a person holding a personal mobile device 90 is located in an indoor space which enters an evacuation state due to a gunshot event. The personal mobile device 90 is connected to an indoor locator 38 via the emergency evacuation APP to locate the person. Furthermore, the visualized map image 90D at the lower end of the display 90A of the personal mobile device 90 is an indoor map 66B designating a personal mobile device location 73, a gun symbol indicating the gunshot event location, and a star indicating an emergency refuge area 74. As shown in FIG. 6, the gunshot event occurs in a right area of a hall in a building, and the personal mobile device location 73 is in a room 66C in a left area of the hall. The emergency evacuation APP activates a camera of the personal mobile device 90 to pick up the image of the environment around the personal mobile device location 73, and the image is displayed on the display 90A and is above the visualized map image 90D. Furthermore, an evacuation route 90E based on the personal mobile device location 73 and the emergency refuge area 74 is displayed on the outdoor map 66A. A moving direction indicator 90C is obtained according to an angle and a position of the personal mobile device 90, and the moving direction 90C overlaps with the image of the environment to form an augmented reality image 90B.

Thus, the person holding the personal mobile device 90 can quickly reach the emergency refuge area 74 according to the augmented reality image 90B based on which the person can know his or her position and the distance to the gunshot event location as well as whether he or she is approaching the emergency refuge area 74. Furthermore, the person can check whether he or she will encounter the gunman in the evacuation route 90E.

As shown in FIG. 6, the visualized map image 90D is based on an indoor space at a floor of a building, and the emergency refuge area 74 is selected to be an outdoor space by the central access control system 10. Namely, the person holding the personal mobile device 90 will be guided out of the building rather than hiding in a room 66C of the floor of the building. This is because the person holding the personal mobile device 90 is near the door of the building, and the person following the evacuation route 90E between the personal mobile device location 73 and the outdoor space will not encounter the gunman. Therefore, the system decides the navigation instruction of leaving the building.

The navigation method according to the present invention provides detection and control of a gunshot to rapidly detect the gunshot location, and the control device 33 can be used to rapidly set the door locks 20 near the gunshot location to the locking state and to revoke the unlocking authority, delaying or stopping the gunman from moving to another location.

The navigation method according to the present invention rapidly provides the controlled event location 71 and the suggested emergency refuge area 74 after entrance of the evacuation state. Thus, the persons in the place can immediately know the controlled event and where to take refuge, reducing the casualty.

When the gunshot control state is reentered, the navigation method according to the present invention provides the personal mobile device location 73 of the person holding the personal mobile device 90 and the controlled event location 71, such that the person can rapidly judge whether he or she is in a safe place.

The navigation method according to the present invention can immediately change the suggested emergency refuge area according to the newest gunshot location, enabling the person to avoid the gunman.

In the navigation method according to the present invention, after a fire occurs, a portion of the door locks 20 within the fire control area can be set to the locking state and loses the unlocking authority, such that the closed doors can temporarily stop the fire from spreading. Furthermore, after the fire control state is entered, the fire system can be informed at the first moment, reducing the time for the firemen to reach the fire site.

After entering the fire control state, the navigation method according to the present invention provides the personal mobile device location 73 of the person holding the personal mobile device 90 and the controlled event location 71, such that the person can rapidly judge whether he or she is in a safe place and where to evacuate.

The navigation method according to the present invention enables the person holding the personal mobile device 90 to rapidly reach the emergency refuge area 74 based on the augmented reality image 90B, which can more simply guide the person during emergent evacuation.

The personal mobile device location 73, the controlled event location 71, the emergency refuge area 74, and the evacuation route 90E are labeled on the visualized map image 90D according to the present invention, such that the person holding the personal mobile device 90 can clearly know his or her location and can judge the exact evacuation route as well as the distance to the controlled event, increasing the success possibility of evacuation.

In the navigation method according to the present invention, the augmented reality image 90B and the visualized map image 90D are simultaneously shown on the display 90A of the personal mobile device 90, such that the person can more clearly know his or her location during evacuation. Thus, the overall navigation is simpler and easier to understand and is more efficient.

In the navigation method according to the present invention, the indoor locators 38A are used to locate the personal mobile device 90 in an indoor space, and the outdoor locators 92 (such as satellites) are used to locate the personal mobile device 90 in an outdoor space. Thus, regardless of the position of the person holding the personal mobile device 90, the person can be easily guided to the emergency refuge area 74. Furthermore, the visualized map image 90D can be rapidly switched between an outdoor map 66A and an indoor map 66B.

Now that the basic teachings of the present invention have been explained, many extensions and variations will be obvious to one having ordinary skill in the art. For example, the personal device is not limited to smart mobile devices and can be in the form of a portable mobile device, such as a notebook computer, a smart watch, etc. Furthermore, the indoor locators 28A can be independent from the door locks 20. Namely, each indoor locator 28A is disposed outside of the respective door lock 20 and can be disposed in any desired place in a room. Furthermore, the safety reporting devices 54, the fire detection devices 56, the gunshot detection devices 61, and the fire reporting device 58 can be connected to the server 53 instead of the control device 33. When a fire or a gunshot is detected, the event is reported back to the server 53 which, in turn, controls the control device 33 to lock the associated door locks 20.

Thus since the illustrative embodiments disclosed herein may be embodied in other specific forms without departing from the spirit or general characteristics thereof, some of which forms have been indicated, the embodiments described herein are to be considered in all respects illustrative and not restrictive. The scope is to be indicated by the appended claims, rather than by the foregoing description, and all changes which come within the meaning and range of equivalency of the claims are intended to be embraced therein.

The invention claimed is:

1. A navigation method for evacuation in the emergency state, comprising:

creating an electronic map of a place to be controlled and storing the electronic map;

connecting a plurality of door locks in the place with a control device, with the control device obtaining control authority of each of the plurality of door locks and being in connection with a server;

connecting an unlocking device with the control device, with the control device identifying the unlocking device, wherein the control device actuates and sets all of the plurality of door locks to a locking state when the unlocking device is identified as being incorrect, and wherein each of all of the plurality of door locks obtains unlocking authority when the unlocking device is identified as being correct;

detecting whether a controlled event occurs, wherein each of the plurality of door locks retains the unlocking authority when no controlled event is detected, wherein information containing a location of a controlled event is sent to the server when the controlled event is detected;

setting at least one of the plurality of door locks near the location of the controlled event to the locking state and revoking the unlocking authority of the at least one of the plurality of door locks, and entering an evacuation state;

locating a personal mobile device held by a person in the place; and using the personal mobile device to pick up an image of an environment of the person, displaying an augmented reality image on a display of the personal mobile device based on the image of the environment, and using the augmented reality image to guide the person to an emergency refuge area in the place, wherein the augmented reality image shows a moving direction indicator to guide the person to the emergency refuge area, wherein locating the personal mobile device includes disposing a plurality of indoor locators in a plurality of indoor spaces in the place, wherein when the personal mobile device is in one of the plurality of indoor spaces, the personal mobile device is connected to one of the plurality of indoor locators nearby, thereby locating the person holding the personal mobile device, wherein a visualized map image is shown on the display, wherein a personal mobile device location is marked on the visualized map image, wherein locating the personal mobile device includes disposing a plurality of outdoor locators in an outdoor space, wherein when the personal mobile device is in the outdoor space, the personal mobile device is connected to one of the plurality of outdoor locators nearby, thereby locating the person holding the personal mobile device, wherein a visualized map image is shown on the display, wherein the personal mobile device location is marked on the visualized map image, wherein the electronic map includes at least one outdoor map and at least one indoor map, wherein when the personal mobile device is located by one of the plurality of indoor locators, the visualized map image shows an indoor image of a respective one of the plurality of indoor spaces in which an associated indoor locator is disposed, wherein when the personal mobile device is located by one of the plurality of outdoor locators, the visualized map image shows an outdoor image of an outdoor space in which an associated outdoor locator is disposed, wherein the visualized map image shows the controlled event location, the personal mobile device location, the emergency refuge area, and an evacuation route, wherein the evacuation route shows a path from the personal mobile device location to the emergency refuge area, wherein the method further comprises:

determining whether to change the controlled event location, wherein the controlled event location is not changed when no new controlled event is detected, wherein a new controlled event location is designated when a new controlled event occurs in a different location is detected, and a location indicating the new controlled event is shown on the visualized mag image; and determining whether to change the emergency refuge area, wherein the emergency refuge area and the evacuation route are not changed when no new controlled event is detected or the new controlled event is not in the evacuation route, wherein when a controlled event occurs in the emergency refuge area or a new controlled event occurs in the evacuation route, a new emergency refuge area is designated and shown on the visualized data image, and a new evacuation route is given based on the location of the personal mobile device and the new emergency refuge area.

2. The navigation method for evacuation in the emergency state as claimed in claim 1, further comprising marking the controlled event on the visualized map image.

3. The navigation method for evacuation in the emergency state as claimed in claim 2, wherein guiding the person to the emergency refuge area includes showing the emergency refuge area and an evacuation route on the visualized map image, wherein the evacuation route shows a path from the location of the personal mobile device to the emergency refuge area.

4. The navigation method for evacuation in the emergency state as claimed in claim 3, wherein the augmented reality image is shown on an upper portion of the display, and wherein the visualized map image is shown on a lower portion of the display.

5. The navigation method for evacuation in the emergency state as claimed in claim 3, wherein the controlled event is a gunshot event detected by one of a plurality of gunshot detection devices or a fire detected by one of a plurality of fire detection devices, and wherein showing the controlled event location on the visualized map image includes showing a gun symbol on the visualized map image when the controlled event is a gunshot event or showing a fire symbol on the visualized map image when the controlled event is a fire event.

6. The navigation method for evacuation in the emergency state as claimed in claim 1, wherein the plurality of indoor locators is disposed in the plurality of door locks, respectively.

7. The navigation method for evacuation in the emergency state as claimed in claim 1, further comprising: showing a visualized map image on the display of the personal mobile device, and marking the controlled event on the visualized map image.

8. The navigation method for evacuation in the emergency state as claimed in claim 7, wherein guiding the person to the emergency refuge area includes showing the emergency refuge area and an evacuation route on the visualized map image, wherein the evacuation route shows a path from the location of the personal mobile device to the emergency refuge area.

9. The navigation method for evacuation in the emergency state as claimed in claim 8, wherein the augmented reality image is shown on an upper portion of the display, and wherein the visualized map image is shown on a lower portion of the display.

10. The navigation method for evacuation in the emergency state as claimed in claim 8, wherein the controlled event is a gunshot event detected by one of a plurality of gunshot detection devices or a fire detected by one of a plurality of fire detection devices, and wherein showing the controlled event location on the visualized map image includes showing a gun symbol on the visualized map image when the controlled event is a gunshot event or showing a fire symbol on the visualized map image when the controlled event is a fire event.

\* \* \* \* \*